(12) United States Patent
Sugioka et al.

(10) Patent No.: US 11,177,535 B2
(45) Date of Patent: Nov. 16, 2021

(54) SEPARATOR AND NON-AQUEOUS ELECTROLYTE BATTERY

(71) Applicants: Maxell Holdings, Ltd., Kyoto (JP); NIPPON KODOSHI CORPORATION, Kochi (JP)

(72) Inventors: Yu Sugioka, Kyoto (JP); Masahiro Kuroiwa, Kochi (JP); Naoya Kawasawa, Kochi (JP)

(73) Assignees: Maxell Holdings, Ltd., Kyoto (JP); NIPPON KODOSHI CORPORATION, Kochi (JP)

( * ) Notice: Subject to any disclaimer, the term of this patent is extended or adjusted under 35 U.S.C. 154(b) by 284 days.

(21) Appl. No.: 16/332,252

(22) PCT Filed: Mar. 14, 2018

(86) PCT No.: PCT/JP2018/009917
§ 371 (c)(1),
(2) Date: Mar. 11, 2019

(87) PCT Pub. No.: WO2018/186135
PCT Pub. Date: Oct. 11, 2018

(65) Prior Publication Data
US 2019/0229317 A1 Jul. 25, 2019

(30) Foreign Application Priority Data
Apr. 6, 2017 (JP) .............................. JP2017-075845

(51) Int. Cl.
*H01M 50/44* (2021.01)
*H01M 50/429* (2021.01)
(Continued)

(52) U.S. Cl.
CPC .............. *H01M 50/44* (2021.01); *D21H 5/20* (2013.01); *D21H 13/26* (2013.01); *D21H 15/10* (2013.01);
(Continued)

(58) Field of Classification Search
None
See application file for complete search history.

(56) References Cited

U.S. PATENT DOCUMENTS 6,200,706 B1   3/2001   Ashida et al.
6,447,958 B1   9/2002   Shinohara et al.
(Continued)

FOREIGN PATENT DOCUMENTS

CN   1179855 A   4/1998
CN   1725524 A   1/2006
(Continued)

OTHER PUBLICATIONS

International Search Report (PCT/ISA/210) issued in PCT/JP2018/009917, dated May 15, 2018.
(Continued)

*Primary Examiner* — Jonathan Crepeau
(74) *Attorney, Agent, or Firm* — Birch, Stewart, Kolasch & Birch, LLP

(57) ABSTRACT

A non-aqueous electrolyte battery of the present invention includes a positive electrode, a negative electrode, a separator, and a non-aqueous electrolyte, and the separator contains polyphenylenesulfide fibers, aramid fibers, and cellulose fibers at ratios of 50 to 85 mass %, 10 to 30 mass %, and 5 to 35 mass %, respectively. This makes it possible to provide a non-aqueous electrolyte battery with characteristics that are less likely to deteriorate under a high-temperature environment and in which few defects occur during assembly.

12 Claims, 1 Drawing Sheet

(51) Int. Cl.
  *H01M 50/411* (2021.01)
  *D21H 13/26* (2006.01)
  *H01G 11/52* (2013.01)
  *D21H 13/10* (2006.01)
  *H01M 10/052* (2010.01)
  *D21H 15/10* (2006.01)

(52) U.S. Cl.
  CPC .......... *H01G 11/52* (2013.01); *H01M 50/411* (2021.01); *H01M 50/4295* (2021.01); *H01M 10/052* (2013.01)

(56) References Cited

U.S. PATENT DOCUMENTS

| | | |
|---|---|---|
| 2003/0180622 A1 | 9/2003 | Tsukuda et al. |
| 2006/0019154 A1 | 1/2006 | Imachi et al. |
| 2007/0287062 A1 | 12/2007 | Tsukuda et al. |
| 2010/0316912 A1 | 12/2010 | Hashimoto et al. |
| 2011/0206972 A1 | 8/2011 | Hashimoto et al. |

FOREIGN PATENT DOCUMENTS

| | | |
|---|---|---|
| CN | 101923957 A | 12/2010 |
| CN | 102177561 A | 9/2011 |
| CN | 105789536 A | 7/2016 |
| EP | 0834936 A | 4/1998 |
| EP | 1737004 A1 | 12/2006 |
| JP | 10-324758 A | 12/1998 |
| JP | 11-144697 A | 5/1999 |
| JP | 2000-106154 A | 4/2000 |
| JP | 2001-40597 A | 2/2001 |
| JP | 2002-134107 A | 5/2002 |
| JP | 2004-127555 A | 4/2004 |
| JP | 2006-274474 A | 10/2006 |
| JP | 2007-150122 A | 6/2007 |
| JP | 2014-183235 A | 9/2014 |
| WO | WO 96/30954 A1 | 10/1996 |
| WO | WO 01/93350 A1 | 12/2001 |
| WO | WO 2005/101432 A1 | 10/2005 |

OTHER PUBLICATIONS

Extended European Search Report, dated Oct. 9, 2020, for European Application No. 18781522.0.

Chinese Office Action and Search Report for Chinese Application No. 201880003512.X, dated Feb. 10, 2021, with English translation of the Office Action.

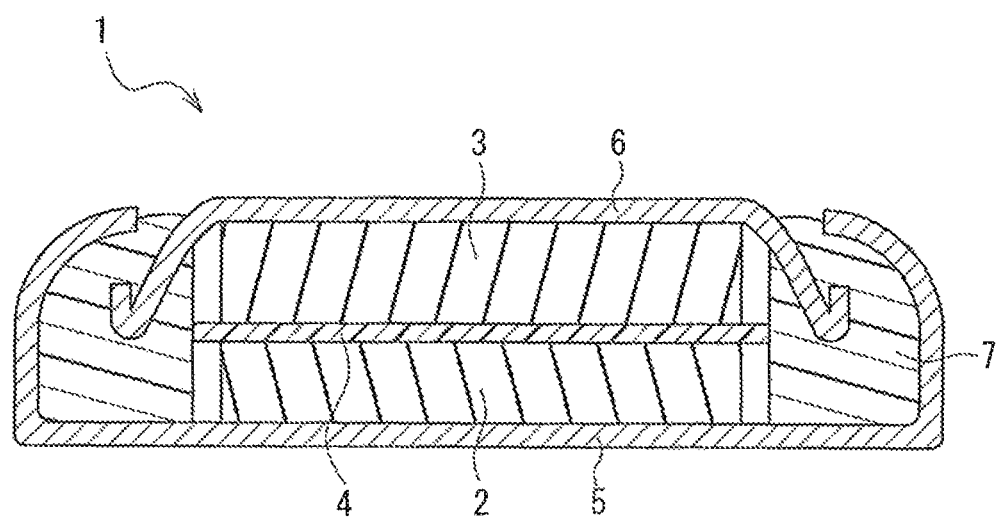

SEPARATOR AND NON-AQUEOUS ELECTROLYTE BATTERY

TECHNICAL FIELD

The present invention relates to a non-aqueous electrolyte battery with characteristics that are less likely to deteriorate under a high-temperature environment and in which few defects occur during assembly, and a separator that enables manufacturing of the non-aqueous electrolyte battery.

BACKGROUND ART

Non-aqueous electrolyte batteries are used in various applications, taking advantage of their characteristics such as high-capacity characteristics and high-voltage characteristics. Improvements in various characteristics thereof have been in demand as a result of an increase in the number of fields to which the non-aqueous electrolyte batteries are applied.

In particular, the practical application of electric cars and the like has resulted in an increase in demand for vehicle-mounted non-aqueous electrolyte batteries (secondary batteries) in recent years. While vehicle-mounted non-aqueous electrolyte batteries are mainly applied to driving power sources for motors in electric cars, they are being increasingly applied to other devices. For example, emergency call systems for making a report about an accident or the like of a vehicle to various related parties are currently under development, and the application of the non-aqueous electrolyte batteries (primary batteries or secondary batteries) to power sources for these systems is being looked into.

In practice, such systems operate in limited cases, but should reliably operate in the event of an emergency. Therefore, the batteries used as power sources are required to have a reliability according to which their characteristics can be favorably maintained despite being stored for a long period of time.

Considering that there have been some cases where a blowout of a tire of a traveling vehicle leads to a serious accident, vehicles equipped with tire pressure monitoring systems (TPMSs) to ensure safety during the travel of the vehicles have become widespread. Non-aqueous electrolyte batteries (primary batteries) are used as power sources for the above-mentioned systems. These systems are installed on the inside of tires that may become hot and humid, and therefore, the batteries used as the power sources are also required to have reliability according to which their characteristics can be maintained for a long period of time.

Furthermore, in some applications, batteries are further required to have high-temperature resistance, and examples of such applications include a medical application in which heat sterilization or the like is required, and an outer space application in which the batteries are assumed to be used under a high-temperature environment at 150° C. or higher. Therefore, a technique for improving heat resistance of electrochemical elements such as non-aqueous electrolyte batteries has been examined such that long-term resistance to a high-temperature environment can be achieved, or there is no danger even if batteries become hot under abnormal conditions.

Improvement of a separator is being looked into as one of the techniques for improving such characteristics. In Patent Document 1, nonwoven fabric for a separator of a non-aqueous electrolyte battery is examined. With such nonwoven fabric, even if an external short circuit occurs between electrodes and heat is thus generated, an internal short circuit due to contact between the electrodes caused by contraction or combustion of the nonwoven fabric will be prevented, thus making it possible to keep the battery from igniting. Patent Document 1 proposes nonwoven fabric containing: one type selected from the group consisting of heat-resistant organic fibers whose melting point or heat decomposition temperature is 250° C. or higher, such as wholly aromatic polyamide fibers, polyphenylenesulfide fibers, wholly aromatic polyester fibers, polyether-ketone fibers, polyimide fibers, polyethersulfone fibers, and poly-p-phenylene benzobisoxazole fibers; one or more types of fibrous binders selected from the group consisting of vinylon fibers, polyester fibers, polyolefin fibers, polyamide fibers, and natural pulps; and the like.

Moreover, Patent Document 2 proposes use of wet-laid nonwoven fabric containing 52 to 78 wt % of polyphenylenesulfide fibers, 20 to 40 wt % of aramid pulp, and 2 to 8 wt % of polyvinyl alcohol fibers as the separator for the purpose of applying the separator to a highly heat-resistant coin-shaped electric double layer capacitor that can withstand high temperatures in a reflow furnace.

Furthermore, Patent Document 3 proposes a separator obtained by combining fibrillated heat-resistant fibers that are constituted by wholly aromatic polyamide fibers, wholly aromatic polyester fibers, or the like and have a melting point or heat decomposition temperature of 250° C. or higher in an amount in a range of 20 to 80 mass %, fibrillated cellulose in an amount in a range of 9 to 25 mass %, and non-fibrillated fibers in an amount in a range of 10 to 71 mass %. Patent Document 3 states that using this separator makes it possible to improve the mechanical strength of the separator in addition to the heat resistance thereof and to prevent the separator from breaking due to crimping during manufacturing of a coin-shaped electric double layer capacitor.

PRIOR ART DOCUMENTS

Patent Documents

Patent Document 1: WO 96/30954
Patent Document 2: JP 2014-183235A
Patent Document 3: WO 2005/101432

DISCLOSURE OF INVENTION

Problem to be Solved by the Invention

Using the separator having the above-mentioned configuration makes it possible to form a non-aqueous electrolyte battery that can be used even under a high-temperature environment at 120° C. or higher, for example. However, it is necessary to examine influences of the strength, water content, processability, and the like in addition to the heat resistance on easiness of assembling a battery during manufacturing of the battery and the characteristics of the assembled battery. Furthermore, in recent years, in addition to these characteristics, reliability in a harsher environment is also in demand, and therefore, it is necessary to further examine fibers to be used to form the separator.

It should be noted that the separator described in Patent Document 3 has favorable heat resistance and mechanical strength, and can thus be prevented from breaking during manufacturing of an electric double layer capacitor and withstand heating during reflow soldering. However, in recent years, the separator is required to not only be able to withstand compression due to crimping during manufacturing of a battery but also have further improved mechanical strength because the battery may be exposed to a high-pressure environment during use.

The present invention was achieved in light of the aforementioned circumstances, and a separator is provided that enables manufacturing of a non-aqueous electrolyte battery with characteristics that are less likely to deteriorate under a high-temperature environment and in which few defects occur during assembly. Moreover, provided is a non-aqueous electrolyte battery with characteristics that are less likely to deteriorate under a high-temperature environment and in which few defects occur during assembly due to the above-mentioned separator being provided therein.

Means for Solving Problem

A separator of the present invention contains polyphenylenesulfide fibers, aramid fibers, and cellulose fibers at ratios of 50 to 85 mass %, 10 to 30 mass %, and 5 to 35 mass %, respectively.

In a preferable embodiment of the separator of the present invention, the compression resistance strength is 15 to 80 N.

Moreover, a non-aqueous electrolyte battery of the present invention includes a positive electrode, a negative electrode, a separator, and a non-aqueous electrolyte, wherein the separator contains polyphenylenesulfide fibers, aramid fibers, and cellulose fibers at ratios of 50 to 85 mass %, 10 to 30 mass %, and 5 to 35 mass %, respectively.

In a preferable embodiment of the non-aqueous electrolyte battery of the present invention, the compression resistance strength of the separator is 15 to 80 N.

Effects of the Invention

With the present invention, it is possible to provide a separator that enables manufacturing of a non-aqueous electrolyte battery with characteristics that are less likely to deteriorate under a high-temperature environment and in which few defects occur during assembly. Moreover, it is possible to provide a non-aqueous electrolyte battery with characteristics that are less likely to deteriorate under a high-temperature environment and in which few defects occur during assembly.

BRIEF DESCRIPTION OF DRAWINGS

FIG. 1 is a schematic cross-sectional view showing an example of a non-aqueous electrolyte battery of the present invention.

DESCRIPTION OF THE INVENTION

The separator of the present invention contains polyphenylenesulfide fibers, aramid fibers, and cellulose fibers at ratios of 50 mass % or more and 85 mass % or less, 10 mass % or more and 30 mass % or less, and 5 mass % or more and 35 mass % or less, respectively. The non-aqueous electrolyte battery of the present invention includes a negative electrode, a positive electrode, a separator, and a non-aqueous electrolyte, and the separator contains polyphenylenesulfide fibers, aramid fibers, and cellulose fibers at ratios of 50 mass % or more and 85 mass % or less, 10 mass % or more and 30 mass % or less, and 5 mass % or more and 35 mass % or less, respectively. In the above-mentioned separator, it is preferable that the content ratio of the polyphenylenesulfide fibers is 55 mass % or more and 75 mass % or less, the content ratio of the aramid fibers is 15 mass % or more and 25 mass % or less, and the content ratio of the cellulose fibers is 15 mass % or more and 25 mass % or less.

The polyphenylenesulfide fibers contained in the separator have high tensile strength and high bending strength, and also have excellent flame retardancy and chemical resistance. Therefore, using the polyphenylenesulfide fibers as the main constituent material (50 mass % or more and 85 mass % or less; preferably 55 mass % or more and 75 mass % or less) makes it possible to form a separator having excellent heat resistance, compression resistance, and electrolyte resistance. That is, if the content ratio of the polyphenylenesulfide fibers is too low, the separator will be more likely to have insufficient compression resistance. On the other hand, if the content ratio of the polyphenylenesulfide fibers is too high, the diameters of pores of the separator will grow larger, which may result in the generation of pinholes and textural defects.

The polyphenylenesulfide fibers have lower wettability to a non-aqueous electrolyte compared to the aramid fibers and cellulose fibers, which will be described later. Therefore, the higher the content ratio of the polyphenylenesulfide fibers in the separator is, the less likely the separator is to absorb the non-aqueous electrolyte. Accordingly, if the content ratio of the polyphenylenesulfide fibers in the separator is too high, problems including that it takes time to inject the liquid during a battery assembly process, or overflowing of the electrolyte are likely to arise.

If the fineness of the polyphenylenesulfide fibers is too small, the density of the separator becomes high, and the air permeability will thus increase, which may result in the prevention of ionic conduction of the non-aqueous electrolyte. Therefore, the fineness is preferably 0.4 dtex or more. Moreover, if the fineness of the polyphenylenesulfide fibers is too large, the diameters of pores of the separator will grow larger, which may cause an internal short circuit of the battery. Therefore the fineness is preferably 3.0 dtex or less.

The aramid fibers are aromatic polyamide fibers. Setting the content ratio of the aramid fibers in a separator to 10 mass % or more and 30 mass % or less, and preferably 15 mass % or more and 25 mass % or less, makes it possible to form a separator having excellent heat resistance and mechanical strength. On the other hand, if the content ratio of the aramid fibers in the separator is too low, the diameters of the pores of the separator will grow larger, which may cause an internal short circuit of the battery. In addition, the separator will be less likely to absorb and retain the non-aqueous electrolyte, which may result in impairment of battery productivity and battery characteristics. Moreover, if the content ratio of the aramid fibers in the separator is too high, the water content in the separator will increase, and therefore, the amount of water brought into the battery will increase during a battery assembly process, which may result in impairment of the characteristics of an assembled battery. In addition, this makes it difficult to process the separator. For example, an issue such as fuzzing is likely to occur when the separator is shaped into a coin shape (circular shape) through punching, which may result in defects occurring during assembly of the battery due to inclusion of formed fuzz, a positional shift of the separator, and the like.

It is preferable that the aramid fibers are fibrillated, and aramid pulp obtained through fibrillation using a refiner, beater, high-pressure homogenizer, or the like is preferably used. It is desirable that the aramid pulp is refined until the CSF value, which is defined in Japanese Industrial Standards (JIS) P 8121 and illustrates the degree of refining, is 200 to 50 mL. If the CSF value of the aramid fibers is too large, the aramid fibers will not disperse uniformly over the entire separator, which may cause a reduction in the strength of the separator. On the other hand, if the CSF value of the aramid fibers is too small, the density of the separator will become high, and the air permeability will thus increase, which may result in the prevention of ionic conduction of the non-aqueous electrolyte.

The cellulose fibers act as binder components in the separator. Setting the content ratio of the cellulose fibers to 5 mass % or more and 35 mass % or less, and preferably 15 mass % or more and 25 mass % or less, makes it possible to further improve the strength of the separator. That is, if the content ratio of the cellulose fibers in the separator is too low, the cellulose fibers will be less likely to act as the binder components, and thus the mechanical strength of the separator cannot be improved. On the other hand, if the content ratio of the cellulose fibers is too high, the cavities in the separator will be blocked, and the air permeability will thus increase, which may result in the prevention of ionic conduction of the non-aqueous electrolyte. Since the cellulose fibers are highly hydrophilic, if the content ratio thereof is too high, the water content in the separator will increase, which may result in impairment of the characteristics of the assembled battery. It should be noted that cellulose has no melting point and does not melt under a high-temperature environment, and therefore, it is preferable that the separator contains the cellulose fibers from the viewpoint of improving the heat resistance of the separator.

Examples of the cellulose fibers include softwood pulp, hardwood pulp, and cotton linter pulp. These types of cellulose pulp may be purified pulp such as dissolved pulp or mercerized pulp. Rayon fibers, polynosic fibers, lyocell fibers, and regenerated cellulose fibers such as solvent spun cellulose fibers may also be used.

The binder function of the cellulose fibers can be further improved through refining of the cellulose fibers. Fibers are refined through refining, but refined fibers have impaired filterability, and therefore, the more the fibers are refined, the smaller the CSF value is.

There is no particular limitation on the degree of refining of the cellulose fibers. For example, when the CSF value is about 100 to 0 mL, the mechanical strength of the separator can be further improved, thus making it possible to use the separator under harsh use conditions, which is in demand in recent years. In particular, when the CSF value of the cellulose fibers is in a range of 80 to 5 mL, the fibers are not excessively refined, and therefore, the cellulose fibers can act as binders while the resistance against compression in the thickness direction of the separator can be further improved.

The separator may also contain components other than the polyphenylenesulfide fibers, the aramid fibers, and the cellulose fibers as long as the functions of the separator required in the present invention are not inhibited.

There is no particular limitation on the thickness of the separator, but the thickness is practically about 100 to 400 μm from the viewpoint of the shielding performance and mechanical strength of the separator and the internal resistance of the assembled battery.

There is also no particular limitation on the density (apparent density) of the separator, but the density is practically about 0.2 to 0.6 $g/cm^3$ from the viewpoint of the shielding performance and mechanical strength of the separator and the internal resistance of the assembled battery.

Applying the above-described configuration makes it possible to form a separator having high shielding performance, high mechanical strength, and low internal resistance.

It should be noted that separators constituted by wet-laid nonwoven fabric formed using a papermaking method are shown in examples, which will be described later, but the separator according to the present invention is not limited to that constituted by wet-laid nonwoven fabric.

The average diameter of pores of the separator is preferably 0.1 μm or more from the viewpoint of increasing the lithium ion permeability inside the separator and improving the load characteristics of the battery. The average diameter of pores of the separator is preferably 10 μm or less, and more preferably 5.0 μm or less, from the viewpoint of further preventing lithium ion dendrites to suppress a micro-short circuit of the battery. The average diameter of pores of the separator is measured in accordance with a bubble point method defined in JIS K 3832.

The air permeability (Gurley value) of the separator is preferably 40 seconds/100 mL or less, and more preferably 25 seconds/100 mL or less, in order to improve the load characteristics of the battery. On the other hand, the air permeability is preferably 0.5 seconds/100 mL or more, and more preferably 1 second/100 mL or more, in order to prevent an internal short circuit caused by an excessive increase in the maximum diameter of the pores. It should be noted that the air permeability of the separator is measured based on the regulations of JIS P 8117.

The compression resistance strength of the separator is preferably 15 N or more. Applying the configuration, which has been described above, to the separator makes it possible to achieve such compression resistance strength.

The "compression resistance strength of the separator" as used herein refers to the maximum point load (N) measured while the separator is compressed in the thickness direction at a speed of 2 mm/minute using a disk with a diameter of 16 mm until it tears. It should be noted that a hand-held compression tester manufactured by Kato Tech Co., Ltd. was used for the measurement.

In recent years, non-aqueous electrolyte batteries are also required to operate under a high-pressure environment. Under a high-pressure environment, a load is applied to the battery in the thickness direction, and the separator is compressed inside the battery. If the compression resistance strength of the separator is less than 15 N, the separator cannot withstand such a high-pressure environment, and there is a risk that a short circuit will occur in the battery.

There is no particular limitation on the upper limit of the compression resistance strength of the separator, but it is thought that the upper limit is practically about 80 N based on the thickness and density of the separator.

It should be noted that the separator to be used in the non-aqueous electrolyte battery of the present invention contains highly hydrophilic aramid fibers and cellulose fibers in a total amount of 15 mass % or more, and therefore, if the separator is assembled into the battery as it is, the amount of water brought into the battery will increase compared to a case where a general-purpose polyolefin separator is used. For this reason, it is preferable that the separator is dried in advance at a temperature of about 100 to 150° C. and then used in the assembly of the battery.

A material that can be used as an active material for a negative electrode of a non-aqueous electrolyte primary battery or a non-aqueous electrolyte secondary battery can be used for the negative electrode of the non-aqueous electrolyte battery.

Specific examples of the negative electrode active material include lithium; lithium alloys such as an Li—Al alloy, an Li—Si alloy, and an Li—Sn alloy; carbonaceous materials such as graphite and low crystallinity carbon; and oxide materials such as SiO, SnO, $Li_4Ti_5O_{12}$, and $LiMn_2O_4$.

The negative electrode may be made of only the negative electrode active material, or a molded article obtained by molding, through compression molding, a mixture of the negative electrode active material with a conductive assistant, a binder, and the like may be used as the negative electrode. Alternatively, a molded article obtained as follows may also be used as the negative electrode: a coating material is formed by dispersing or dissolving the negative electrode active material together with a conductive assistant, a binder, and the like in a dispersion medium such as water or an organic solvent, a current collector constituted by a metal foil, expanded metal, plain-woven wire net, or the like is coated with the coating material and dried, and then compression molding is performed to form the molded article. Furthermore, when lithium or a lithium alloy is used as the negative electrode active material, a metal foil made of such a material can also be used as the negative electrode.

A material that can be used as an active material for a positive electrode of a non-aqueous electrolyte primary battery or a non-aqueous electrolyte secondary battery can be used for the positive electrode of the non-aqueous electrolyte battery.

Specific examples of the positive electrode active material include oxides such as $MnO_2$ and $TiO_2$; sulfides such as $FeS_2$ and $TiS_2$; graphite fluoride; lithium-containing composite oxides having a layer structure represented by formulae $Li_{1+x}M^1O_2$ ($-0.1<x<0.1$, $M^1$: one or more elements selected from Co, Ni, Mn, Al, Mg, Ti, Zr and the like) and the like; lithium manganese composite oxides having a spinel structure represented by formulae $Li_{1+y}M^2{}_2O_4$ ($-0.1<y<0.1$, $M^2$: Mn, or Mn and one or more elements selected from Co, Ni, Al, Mg, Ti, Zr and the like) and the like; lithium titanium composite oxides having a spinel structure represented by formulae $Li_4Ti_5O_{12}$ and the like; low crystallinity lithium manganese composite oxides represented by formulae $LiMn_3O_6$ and the like; and olivine compounds represented by formulae $Li_{1+z}M^3PO_4$ ($-0.1<z<0.1$, $M^3$: one or more elements selected from Co, Ni, Mn, Fe and the like) and the like.

The positive electrode may be made of only the positive electrode active material, or a molded article obtained by molding, through compression molding, a mixture of the positive electrode active material with a conductive assistant, a binder, and the like may be used as the positive electrode. Alternatively, a molded article obtained as follows may also be used as the positive electrode: a coating material is formed by dispersing or dissolving the positive electrode active material together with a conductive assistant, a binder, and the like in a dispersion medium such as water or an organic solvent, a current collector constituted by a metal foil, expanded metal, plain-woven wire net, or the like is coated with the coating material and dried, and then compression molding is performed to form the molded article.

In the non-aqueous electrolyte battery, the negative electrode and the positive electrode are used in the form of a laminate (layered electrode body) obtained by layering the negative electrode and the positive electrode with a separator being sandwiched therebetween, or in the form of a wound body (wound electrode body) obtained by winding the above-mentioned laminate into a spiral shape, for example.

A solution obtained by dissolving an electrolytic salt in an organic solvent can be used as the non-aqueous electrolyte of the non-aqueous electrolyte battery. As the electrolytic salt, at least one selected from $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(FSO_2)_2$, $LiN(CF_3SO_2)_2$, $LiC(CF_3SO_2)_3$, $LiC_nF_{2n+1}SO_3$ ($n\geq2$), and $LiN(RfOSO_2)_2$ (where Rf is a fluoroalkyl group), and the like can be used, for example. Among these salts, at least one type of lithium salt selected from $LiClO_4$, $LiBF_4$, $LiCF_3SO_3$, $Li_2C_2F_4(SO_3)_2$, $LiN(FSO_2)_2$, $LiN(CF_3SO_2)_2$, $LiC(CF_3SO_2)_3$, and $LiCF_3CO_2$ is preferably used.

The concentration of the lithium salt in the non-aqueous electrolyte is preferably 0.3 mol/L or more, more preferably 0.5 mol/L or more, and even more preferably 0.8 mol/L or more, and is also preferably 1.8 mol/L or less, more preferably 1.5 mol/L or less, and even more preferably 1.2 mol/L or less.

Two or more types of lithium salts can be used together. In this case, it is sufficient that adjustment is performed such that the total concentration of the lithium salts falls within the above-mentioned ranges.

Examples of the organic solvent for the non-aqueous electrolyte include cyclic carbonates such as ethylene carbonate, propylene carbonate, butylene carbonate, and vinylene carbonate; chain carbonates such as dimethyl carbonate, diethyl carbonate, and methylethyl carbonate; ethers such as 1,2-dimethoxyethane, diglyme (diethylene glycol dimethyl ether), triglyme (triethylene glycol dimethyl ether), tetraglyme (tetraethylene glycol dimethyl ether), methoxyethoxyethane, 1,2-diethoxyethane, and tetrahydrofuran; cyclic esters such as γ-butyrolactone; and acetonitrile. These solvents may be used alone or in combination of two or more. It is particularly preferable to use the above-mentioned cyclic carbonate together with the above-mentioned chain carbonate or ether.

When the cyclic carbonate and the ether are used together as the organic solvents, it is preferable that the ratio (mixing ratio) of the amount of cyclic carbonate to the amount of ether in the entire solvent is set such that cyclic carbonate:ether=30:70 to 70:30 (volume ratio).

It is also possible to add an additive shown below as an example to the non-aqueous electrolyte in order to improve various characteristics of the battery.

Examples of the additive that can be added to the non-aqueous electrolyte include saturated or unsaturated sultone compounds such as 1,3-propanesultone, 1,4-butanesultone, and 1,3-propenesultone; organic lithium borates such as lithium tetrakis(acetate)borate, lithium tetrakis(fluoroacetate)borate, lithium tetrakis(difluoroacetate)borate, lithium tetrakis(trifluoroacetate)borate, and lithium bis(oxalate)borate (LiBOB); dinitriles such as succinonitrile, glutaronitrile, and adiponitrile; acid anhydrides such as maleic anhydride and phthalic anhydride; fluorinated cyclic carbonates such as fluoroethylene carbonate; phosphoric acid compounds and boric acid compounds having a trimethylsilyl group such as tris(trimethylsilyl) phosphate and tris(trimethylsilyl) borate; and vinylene carbonate.

As described above, when the battery is assembled, it is preferable that the separator according to the non-aqueous electrolyte battery of the present invention is dried in advance. However, when the battery is assembled without drying the separator, or the battery is used in an application in which the battery is used under a high-temperature environment and water has a greater influence on the battery characteristics, it is preferable that the non-aqueous electrolyte contains at least one additive selected from the above-mentioned sultone compounds, the above-mentioned organic lithium borates, the phosphoric acid compounds having a trimethylsilyl group, and the boric acid compounds having a trimethylsilyl group in order to reduce the influence of water brought into the battery by the separator.

The addition amount of the above-mentioned additive varies in favorable value depending on the amount of water brought into the battery or the type of compound to be added, but the ratio of the addition amount of the additive to the total amount of the non-aqueous electrolyte is preferably about 0.1 mass % or more, more preferably 0.5 mass % or more, and even more preferably 1 mass % or more.

On the other hand, if the addition amount of the above-mentioned additive is too large, the internal resistance of the battery will increase due to a film made of the additive being formed on the electrodes, which may cause impairment of the load characteristics. Therefore, the ratio of the addition amount of the additive to the total amount of the non-aqueous electrolyte is preferably about 8 mass % or less, more preferably 5 mass % or less, and even more preferably 3 mass % or less.

There is no particular limitation on an exterior member in which the above-mentioned negative electrode, positive electrode, separator, and non-aqueous electrolyte are encapsulated, and conventional exterior members for a non-aqueous electrolyte battery, such as a metal container and a metal laminated film, can be used.

In a flat battery and the like in which a metal container is sealed via a resin gasket, a gasket made of a polyolefin-based resin such as polyethylene (PE) or polypropylene (PP), or a mixture or copolymer thereof can also be used. However, it is desirable that a gasket made of a heat-resistant resin whose melting point or heat decomposition temperature is 200° C. or higher is used in order to take advantage of excellent heat resistance of the separator to form a battery with excellent high-temperature durability.

Examples of the above-mentioned heat-resistant resin include fluororesins such as polychlorotrifluoroethylene (PCTFE), tetrafluoroethylene-perfluoroalkoxyethylene copolymer (PFA), and tetrafluoroethylene-hexafluoropropylene copolymer (FEP); polyphenylene ether (PPE); polysulfone (PSF); polyarylate (PAR); polyethersulfone (PES); polyphenylenesulfide (PPS); polyetheretherketone (PEEK); polybutylene terephthalate (PBT); and nylon. The fluororesin, PSF, PPS, PBT or the like having low water permeability is preferably used.

The separator of the present invention can be used in not only the above-mentioned non-aqueous electrolyte battery but also various electrochemical elements such as an electric double layer capacitor.

Impairment of the characteristics under a high-temperature environment is suppressed, and therefore, it is possible to take advantage of such characteristics to favorably use the non-aqueous electrolyte battery of the present invention particularly in an application in which the battery is likely to be exposed to high temperatures, such as an automobile application including a power source for a tire internal pressure sensor, as well as the same applications as various applications in which conventionally known non-aqueous electrolyte batteries are used.

EXAMPLES

Hereinafter, the present invention will be described in detail based on examples. However, the present invention is not limited to the following examples.

Manufacturing Examples of Separator

Manufacturing Example 1

A slurry obtained by dispersing 50 mass % of polyphenylenesulfide fibers (fineness: 1.1 dtex, fiber length: 5 mm), 25 mass % of aramid pulp (CSF value: 150 mL), and 25 mass % of softwood pulp (CSF value: 50 mL) in water was prepared, and a separator of wet-laid nonwoven fabric (thickness: 100 μm, apparent density: 0.2 g/cm$^3$, compression resistance strength: 15 N, air permeability: 32 seconds/100 mL, average pore diameter: 3 μm) was produced by mixing the fibers in a cylinder papermaking machine.

Manufacturing Example 2

A separator of wet-laid nonwoven fabric (thickness: 200 μm, apparent density: 0.5 g/cm$^3$, compression resistance strength: 25 N, air permeability: 38 seconds/100 mL, average pore diameter: 3.2 μm) was produced in the same manner as in Manufacturing Example 1, except that the ratios of the polyphenylenesulfide fibers, aramid pulp, and softwood pulp were changed to 55 mass %, 30 mass %, and 15 mass %, respectively.

Manufacturing Example 3

A separator of wet-laid nonwoven fabric (thickness: 200 μm, apparent density: 0.6 g/cm$^3$, compression resistance strength: 35 N, air permeability: 40 seconds/100 mL, average pore diameter: 2.7 μm) was produced in the same manner as in Manufacturing Example 1, except that the ratios of the polyphenylenesulfide fibers, aramid pulp, and softwood pulp were changed to 60 mass %, 15 mass %, and 35 mass %, respectively.

Manufacturing Example 4

A separator of wet-laid nonwoven fabric (thickness: 300 μm, apparent density: 0.2 g/cm$^3$, compression resistance strength: 60 N, air permeability: 6 seconds/100 mL, average pore diameter: 5.6 μm) was produced in the same manner as in Manufacturing Example 1, except that the ratios of the polyphenylenesulfide fibers, aramid pulp, and softwood pulp were changed to 75 mass %, 20 mass %, and 5 mass %, respectively.

Manufacturing Example 5

A separator of wet-laid nonwoven fabric (thickness: 400 μm, apparent density: 0.6 g/cm$^3$, compression resistance strength: 80 N, air permeability: 0.5 seconds/100 mL, average pore diameter: 6.4 μm) was produced in the same manner as in Manufacturing Example 1, except that the ratios of the polyphenylenesulfide fibers, aramid pulp, and softwood pulp were changed to 85 mass %, 10 mass %, and 5 mass %, respectively.

Manufacturing Example 6

A separator of wet-laid nonwoven fabric (thickness: 400 μm, apparent density: 0.6 g/cm$^3$, compression resistance strength: 10 N, air permeability: 54 seconds/100 mL, average pore diameter: 1.8 μm) was produced in the same manner as in Manufacturing Example 1, except that the ratios of the polyphenylenesulfide fibers, aramid pulp, and softwood pulp were changed to 40 mass %, 25 mass %, and 35 mass %, respectively.

Manufacturing Example 7

A separator of wet-laid nonwoven fabric (thickness: 400 μm, apparent density: 0.6 g/cm$^3$, compression resistance strength: 90 N, air permeability: 0.4 seconds/100 mL, average pore diameter: 6.8 μm) was produced in the same manner as in Manufacturing Example 1, except that the ratios of the polyphenylenesulfide fibers, aramid pulp, and softwood pulp were changed to 90 mass %, 10 mass %, and 0 mass %, respectively.

Manufacturing Example 8

A separator of wet-laid nonwoven fabric (thickness: 400 μm, apparent density: 0.6 g/cm³, compression resistance strength: 70 N, air permeability: 21 seconds/100 mL, average pore diameter: 6.4 μm) was produced in the same manner as in Manufacturing Example 1, except that the ratios of the polyphenylenesulfide fibers, aramid pulp, and softwood pulp were changed to 80 mass %, 5 mass %, and 15 mass %, respectively.

Manufacturing Example 9

A separator of wet-laid nonwoven fabric (thickness: 400 μm, apparent density: 0.6 g/cm³, compression resistance strength: 25 N, air permeability: 24 seconds/100 mL, average pore diameter: 3.5 μm) was produced in the same manner as in Manufacturing Example 1, except that the ratios of the polyphenylenesulfide fibers, aramid pulp, and softwood pulp were changed to 55 mass %, 35 mass %, and 10 mass %, respectively.

Manufacturing Example 10

A separator of wet-laid nonwoven fabric (thickness: 100 μm, apparent density: 0.2 g/cm³, compression resistance strength: 20 N, air permeability: 34 seconds/100 mL, average pore diameter: less than 0.1 μm) was produced in the same manner as in Manufacturing Example 1, except that the ratios of the polyphenylenesulfide fibers, aramid pulp, and softwood pulp were changed to 50 mass %, 10 mass %, and 40 mass %, respectively.

Table 1 shows the configurations of the separators.

TABLE 1

| | Configuration of separator (mass %) | | |
|---|---|---|---|
| | Polyphenylenesulfide fibers | Aramid fibers (Aramid pulp) | Cellulose fibers (Softwood pulp) |
| Manu. Ex. 1 | 50 | 25 | 25 |
| Manu. Ex. 2 | 55 | 30 | 15 |
| Manu. Ex. 3 | 60 | 15 | 35 |

TABLE 1-continued

| | Configuration of separator (mass %) | | |
|---|---|---|---|
| | Polyphenylenesulfide fibers | Aramid fibers (Aramid pulp) | Cellulose fibers (Softwood pulp) |
| Manu. Ex. 4 | 75 | 20 | 5 |
| Manu. Ex. 5 | 85 | 10 | 5 |
| Manu. Ex. 6 | 40 | 25 | 35 |
| Manu. Ex. 7 | 90 | 10 | 0 |
| Manu. Ex. 8 | 80 | 5 | 15 |
| Manu. Ex. 9 | 55 | 35 | 10 |
| Manu. Ex. 10 | 50 | 10 | 40 |

The produced separators of Manufacturing Examples 1 to 10 were shaped into a circular shape with a diameter of 19 mm through punching using a punching machine and used to produce coin-type non-aqueous electrolyte batteries, which will be described later. When it was confirmed whether or not fuzz and the like were formed in the separators obtained through punching, a slight amount of fuzz was observed in the separator of Manufacturing Example 2 containing the aramid pulp at a ratio of 30 mass %, and fuzz further increased in the separator of Manufacturing Example 9 containing the aramid pulp at a ratio of 35 mass %.

Regarding the separators other than those of Manufacturing Examples 2 and 9 in which fuzzing was observed, tensile strength was measured under the following conditions. A test piece with a width of 15 mm and a length of 200 mm was cut in the machine direction from the separator sheet, and a tensile test was performed using a tensile tester under conditions where the distance between chucks was 180 mm and the speed was 200 mm/minute, and tensile strength (N/15 mm) was determined.

Regarding the separators of Manufacturing Examples 1 to 10, a liquid retention rate was measured under the following conditions. A test piece with a diameter of 30 mm was cut from the separator sheet, and the mass (W1) was measured. Then, the test piece was immersed in propylene carbonate for 10 minutes. Subsequently, the nonwoven fabric removed therefrom was sandwiched between pieces of filter paper and compressed in this state under 5 MPa of pressure for 30 seconds using a pressing machine so that the filter paper absorbed propylene carbonate spilling out from the nonwoven fabric. Thereafter, the mass (W2) of the separator was measured again, and the liquid retention rate was determined in accordance with the following equation.

Liquid retention rate (%)=$(W2-W1)/W1 \times 100$

Table 2 shows the measurement results from the separators.

TABLE 2

| | Physical properties of separator | | | | | |
|---|---|---|---|---|---|---|
| | Thickness (μm) | Apparent density (g/cm³) | Compression resistance strength (N) | Air permeability (sec/100 mL) | Average pore diameter (μm) | Tensile strength (N/15 mm) | Liquid retention rate (%) |
| Manu. Ex. 1 | 100 | 0.2 | 15 | 32 | 3 | 28.7 | 186 |
| Manu. Ex. 2 | 200 | 0.5 | 25 | 38 | 3.2 | — | 417 |
| Manu. Ex. 3 | 200 | 0.6 | 35 | 40 | 2.7 | 32.2 | 163 |
| Manu. Ex. 4 | 300 | 0.2 | 60 | 6 | 5.6 | 9.8 | 206 |
| Manu. Ex. 5 | 400 | 0.6 | 80 | 0.5 | 6.4 | 10.3 | 100 |
| Manu. Ex. 6 | 400 | 0.6 | 10 | 54 | 1.8 | 30.1 | 152 |
| Manu. Ex. 7 | 400 | 0.6 | 90 | 0.4 | 6.8 | 6.3 | 87 |
| Manu. Ex. 8 | 400 | 0.6 | 70 | 21 | 6.4 | 11.2 | 82 |

TABLE 2-continued

| | Physical properties of separator | | | | | |
|---|---|---|---|---|---|---|
| | Thickness (μm) | Apparent density (g/cm³) | Compression resistance strength (N) | Air permeability (sec/100 mL) | Average pore diameter (μm) | Tensile strength (N/15 mm) | Liquid retention rate (%) |
| Manu. Ex. 9 | 400 | 0.6 | 25 | 24 | 3.5 | — | 450 |
| Manu. Ex. 10 | 100 | 0.2 | 20 | 100 | <0.1 | 29.7 | 91 |

Manufacturing Examples of Non-Aqueous Electrolyte Battery

Manufacturing of Positive Electrode

A positive electrode mixture was prepared by mixing manganese dioxide serving as a positive electrode active material, carbon black serving as a conductive assistant, and polytetrafluoroethylene serving as a binder at a mass ratio of 93:3:4, and was then molded. A positive electrode (positive electrode mixture molded article) with a diameter of 16 mm and a thickness of 1.8 mm was thus obtained.

Manufacturing of Negative Electrode

An aluminum foil with a thickness of 0.01 μm was crimped to one side of a lithium foil with a thickness of 0.6 mm, and the laminated body was punched into a circular shape with a diameter of 16 mm to compose a negative electrode.

Preparation of Non-Aqueous Electrolyte

A mixed solvent was prepared by mixing propylene carbonate and 1,2-dimethoxyethane at a mass ratio of 41.8:51.2, and $LiClO_4$ was dissolved in the mixed solvent to give a concentration of 0.5 mol/L. Furthermore, 1,3-propanesultone was added thereto such that the ratio thereof was 2 mass %, and a non-aqueous electrolyte was thus prepared.

Example 1

A sealing can made of stainless steel in which a gasket made of polyphenylenesulfide is attached to an open end, and an exterior can made of stainless steel were prepared as battery exterior members. The above-mentioned negative electrode was crimped to the inner surface of the sealing can, two separators of Manufacturing Example 1 punched into a circular shape with a diameter of 19 mm were layered on the negative electrode, and the above-mentioned positive electrode was further layered on the separators. The thus-obtained laminate of the negative electrode, the separators, and the positive electrode was arranged inside the sealing can. Subsequently, the above-mentioned non-aqueous electrolyte was injected into the sealing can to soak the separators. Furthermore, the exterior can was placed over the sealing can and sealed through crimping. A coin-type non-aqueous electrolyte battery having a structure shown in FIG. 1 with a diameter of 20 mm and a height of 3.2 mm was thus obtained.

FIG. 1 is a schematic longitudinal cross-sectional view of the non-aqueous electrolyte battery of Example 1. With a non-aqueous electrolyte battery 1 of Example 1, a positive electrode 2 was accommodated inside the exterior can 5 made of stainless steel, and a negative electrode 3 was arranged on the positive electrode 2 via separators 4. The surface of the negative electrode 3 on the lithium layer (lithium foil) side was crimped to the inner surface of a sealing can 6. Although not shown in FIG. 1, a lithium-aluminum alloy was formed on the surface of the negative electrode 3 on the separators 4 side after the assembly of the battery. Furthermore, the non-aqueous electrolyte (not shown) was injected into the battery 1.

In the non-aqueous electrolyte battery 1, the exterior can 5 also served as a positive electrode terminal, and the sealing can 6 also served as a negative electrode terminal. The sealing can 6 was fitted to the opening of the exterior can 5 via a gasket 7 made of polyphenylenesulfide. The open end of the exterior can 5 was fastened inward, and the gasket 7 was thus brought into contact with the sealing can 6. The opening of the exterior can 5 was thus sealed, and therefore, a structure in which the inside of the battery was sealed was obtained. That is, the non-aqueous electrolyte battery 1 included the exterior can 5, the sealing can 6, and the gasket 7 arranged therebetween, and an electrode body that was a laminate of the positive electrode 2, the separators 4, and the negative electrode 3, and the non-aqueous electrolyte were accommodated inside the sealed exterior members.

Example 2

A coin-type non-aqueous electrolyte battery was obtained in the same manner as in Example 1, except that a single separator of Manufacturing Example 2 punched into a circular shape was used in the assembly of the battery.

Example 3

A coin-type non-aqueous electrolyte battery was obtained in the same manner as in Example 1, except that a single separator of Manufacturing Example 3 punched into a circular shape was used in the assembly of the battery.

Example 4

A coin-type non-aqueous electrolyte battery was obtained in the same manner as in Example 1, except that a single separator of Manufacturing Example 4 punched into a circular shape was used in the assembly of the battery.

Example 5

A coin-type non-aqueous electrolyte battery was obtained in the same manner as in Example 1, except that a single separator of Manufacturing Example 5 punched into a circular shape was used in the assembly of the battery.

Comparative Example 1

A coin-type non-aqueous electrolyte battery was obtained in the same manner as in Example 1, except that a single separator of Manufacturing Example 6 punched into a circular shape was used in the assembly of the battery.

Comparative Example 2

A coin-type non-aqueous electrolyte battery was obtained in the same manner as in Example 1, except that a single separator of Manufacturing Example 7 punched into a circular shape was used in the assembly of the battery.

Comparative Example 3

A coin-type non-aqueous electrolyte battery was obtained in the same manner as in Example 1, except that a single separator of Manufacturing Example 8 punched into a circular shape was used in the assembly of the battery.

Comparative Example 4

A coin-type non-aqueous electrolyte battery was obtained in the same manner as in Example 1, except that a single separator of Manufacturing Example 9 punched into a circular shape was used in the assembly of the battery.

Comparative Example 5

A coin-type non-aqueous electrolyte battery was obtained in the same manner as in Example 1, except that two separators of Manufacturing Example 10 punched into a circular shape was used in the assembly of the battery.

During assembly of each of the non-aqueous electrolyte batteries of Examples 1 to 5 and Comparative Examples 1 to 5, a check was made as to whether or not non-aqueous electrolyte that was not absorbed by the separator and leaking out of the sealing can was present. Moreover, a check was made as to whether or not the assembled non-aqueous electrolyte batteries had defects such as a short circuit caused by a positional shift of the separator, the inclusion of the separator, and the like. Table 3 shows the results. In Table 3, cases where no leakage of the non-aqueous electrolyte and no defects such as a short circuit were observed were indicated as "Good", and the other cases were indicated as "Poor".

TABLE 3

|  | Leakage of non-aqueous electrolyte | Defects such as short circuit |
|---|---|---|
| Ex. 1 | Good | Good |
| Ex. 2 | Good | Good |
| Ex. 3 | Good | Good |
| Ex. 4 | Good | Good |
| Ex. 5 | Good | Good |
| Comp. Ex. 1 | Good | Good |
| Comp. Ex. 2 | Poor | Poor |
| Comp. Ex. 3 | Poor | Good |
| Comp. Ex. 4 | Good | Poor |
| Comp. Ex. 5 | Good | Good |

As shown in Table 3, in the case of the battery of Comparative Example 2, leakage of the non-aqueous electrolyte was observed since the ratio of the polyphenylenesulfide fibers contained in the separator was too high, and thus the separator was less likely to absorb the non-aqueous electrolyte. In addition, a short circuit occurred in the assembled battery of Comparative Example 2 since the mechanical strength was low due to no cellulose fibers being contained.

In the case of the battery of Comparative Example 3, leakage of the non-aqueous electrolyte was observed since the ratio of the aramid fibers contained in the separator was too low, and thus the separator was less likely to absorb the non-aqueous electrolyte.

Furthermore, in the case of the battery of Comparative Example 4, defects such as a short circuit caused by a positional shift of the separator, the inclusion of the fibers, and the like were observed during assembly of the battery since the ratio of the aramid fibers contained in the separator was too high, and thus a large amount of fuzz was formed when the separator was punched into a circular shape.

Evaluation of Battery Characteristics

Regarding the non-aqueous electrolyte batteries of Examples 1 to 5 and Comparative Examples 1 and 5, which had no problems during assembly, the battery characteristics were evaluated under the following conditions.

Each battery was stored in a constant temperature oven at 140° C. for 16 hours. Then, the battery was removed therefrom and was allowed to cool. Subsequently, a 100-Ω resistance was connected to the battery, and the battery was discharged at 20° C. A closed circuit voltage (CCV) of the battery was measured 0.3 seconds after the start of discharge.

The batteries of Examples 1 to 5 had a CCV of 1.5 V or more, and functioned normally after the storage at a high temperature. However, in the case of the battery of Comparative Example 1, the amount of water brought into the battery increased due to the aramid fibers and cellulose fibers contained in the separator, and therefore, the battery deteriorated and thus could not be discharged. In the case of the battery of Comparative Example 5, the ratio of the cellulose fibers was too high, and therefore, the average pore diameter was too small, and the internal resistance of the battery thus increased. Accordingly, the CCV was substantially 0 V, and the load characteristics were impaired.

DESCRIPTION OF REFERENCE NUMERALS

1 Non-aqueous electrolyte battery
2 Positive electrode
3 Negative electrode
4 Separator
5 Exterior can
6 Sealing can
7 Gasket

The invention claimed is:

1. A separator containing polyphenylenesulfide fibers, aramid fibers, and cellulose fibers at ratios of 50 to 85 mass %, 10 to 30 mass %, and 5 to 35 mass %, respectively.

2. The separator according to claim 1, wherein a compression resistance strength is 15 to 80 N.

3. The separator according to claim 1, wherein a content ratio of the polyphenylenesulfide fibers is 55 to 75 mass %.

4. The separator according to claim 1, wherein a content ratio of the aramid fibers is 15 to 25 mass %.

5. The separator according to claim 1, wherein a content ratio of the cellulose fibers is 15 to 25 mass %.

6. The separator according to claim 1, which is constituted by wet-laid nonwoven fabric.

7. A non-aqueous electrolyte battery comprising a positive electrode, a negative electrode, a separator, and a non-aqueous electrolyte,
wherein the separator contains polyphenylenesulfide fibers, aramid fibers, and cellulose fibers at ratios of 50 to 85 mass %, 10 to 30 mass %, and 5 to 35 mass %, respectively.

8. The non-aqueous electrolyte battery according to claim 7, wherein a compression resistance strength of the separator is 15 to 80 N.

9. The non-aqueous electrolyte battery according to claim 7, wherein a content ratio of the polyphenylenesulfide fibers in the separator is 55 to 75 mass %.

10. The non-aqueous electrolyte battery according to claim 7, wherein a content ratio of the aramid fibers in the separator is 15 to 25 mass %.

11. The non-aqueous electrolyte battery according to claim 7, wherein a content ratio of the cellulose fibers in the separator is 15 to 25 mass %.

12. The non-aqueous electrolyte battery according to claim 7, wherein the separator is constituted by wet-laid nonwoven fabric.

\* \* \* \* \*